United States Patent [19]

Keller

[11] Patent Number: 4,780,844

[45] Date of Patent: Oct. 25, 1988

[54] DATA INPUT CIRCUIT WITH DIGITAL PHASE LOCKED LOOP

[75] Inventor: Glenn Keller, Los Gatos, Calif.

[73] Assignee: Commodore-Amiga, Inc., Los Gatos, Calif.

[21] Appl. No.: 886,615

[22] Filed: Jul. 18, 1986

[51] Int. Cl.[4] .......... G06F 15/00; G06F 3/00; H03D 3/24

[52] U.S. Cl. .......... 364/900; 360/51; 375/119; 375/120

[58] Field of Search .......... 307/511, 514; 328/133; 375/119, 120; 360/51; 364/200 MS File, 900 MS File

[56] References Cited

U.S. PATENT DOCUMENTS

| 4,357,707 | 11/1982 | Delury | 375/119 |
|---|---|---|---|
| 4,550,391 | 10/1985 | Chung et al. | 360/51 |
| 4,618,898 | 10/1986 | Young et al. | 360/51 |
| 4,633,488 | 12/1986 | Shaw | 375/120 |
| 4,672,482 | 6/1987 | Troletti | 360/51 |
| 4,672,597 | 6/1987 | Yamazaki | 360/51 |

Primary Examiner—Raulfe B. Zache
Assistant Examiner—Thomas C. Lee
Attorney, Agent, or Firm—Finnegan, Henderson, Farabow, Garrett & Dunner

[57] ABSTRACT

A digital phase locked loop circuit for reading input data transmitted from storage media. Counter and adder components establish the time of arrival of input data bits. Inspection windows are established having durations and start/stop times that can be adjusted by correction signals so that subsequent data bits will be received in the middle of the inspection windows. Correction signals to the counter and adder components compensate for variations in the phase and frequency of input data transmitted from storage media.

26 Claims, 2 Drawing Sheets

DATA INPUT CIRCUIT WITH DIGITAL PHASE LOCKED LOOP

FIELD OF THE INVENTION

The invention relates to circuits used to accurately read data pulses transmitted from storage media, such as floppy disks, despite the presence of frequency errors and phase errors during reading of the data. The present invention can operate to interface a disk drive subsystem with a host computer system. This invention further relates to digital phase locked loop circuitry that can be used to interface floppy disk storage media with personal computers.

BACKGROUND OF THE INVENTION

Digital computers transfer information in the form of digital pulses to and from a resource memory to which the host computer system has access, whether the memory is located within the system (local) or at a remote location. In processing the data, it is necessary that the timing of these pulses be determined and controlled so that the various logic functions occurring in the host system can be synchronized with the transfer of digital pulses representing digital data contained within the resource memory.

Information, including program instructions as well as other data, is typically stored in a resource memory on a magnetic medium, and each bit of digital data typically appears as a magnetic transition area on the surface of the medium. In order for the host computer to have access to such data, it is important that the bits of data be accurately positioned on the magnetic medium and be capable of being accurately read therefrom. With the growth in the market for personal computers, the use of a particular type of magnetic memory device, the floppy disk, has greatly increased. Furthermore, as personal computers have been redesigned for greater memory capacity and speed, the storage capacity of floppy disks used with these computers has been increased by increasing the density of the digital data recorded on the floppy disk.

The use of disks as storage media is accompanied by certain problems, however, particularly for disk drive systems used in host computer systems available in the less expensive personal computer and business word processor markets. Although it is a design criteria of disk drive manufacturers to accurately control the speed of rotation of the disk in order to have a fixed period of disk rotation and thereby maintain a predetermined frequency at which one can read data from the disk, one problem is frequency drift during data transfers due to unsteadiness in motor drive speed. This results in frequency error and can cause the data on the disk to be read incorrectly. Another problem is migration of the magnetic transition areas, and thus the data bits on the storage medium, due to the inherent characteristics of the magnetic disk. This results in phase error during data transfers and can also result in incorrect data reads. These sources of error are present in every disk drive system to a certain extent, and are addressed by the circuitry of the present invention.

SUMMARY OF THE INVENTION

An object of the present invention is to provide a data input circuit for a host computer system that has access to a resource memory, such as a floppy disk. The circuit is capable of processing data pulses received from a disk drive and adjusts the input circuit to compensate for phase errors and for frequency errors while the data is being read. Phase locked loop circuitry is implemented to establish inspection windows that can be varied in time duration and/or time of start and stop of the windows. The windows are adjusted so that each subsequent data pulse from memory will occur in the middle of an inspection window.

The input circuit processes each received data pulse to determine if there is a phase error, i.e., the data pulse has shifted from its expected time of arrival, or a frequency error, i.e., the data pulses are arriving at an increased or decreased frequency rate and therefore are not received at the expected time. Frequency measurement and correction, and phase measurement and correction, are carried out by two separate dedicated portions of the circuit.

The circuitry of the invention keeps track of the times of arrival of prior data pulses in order to measure and correct for frequency and phase drift of the data pulses being read from the disk. An up-down counter and an adder are included in the phase locked loop to digitally indicate the precise time of arrival of the data pulses from memory. Decoder circuits process the digital arrival time information for a data pulse or pulses and generate correction signals that are fed back to the counter and adder circuits. The correction signals adjust the duration and start/stop time of each inspection window by causing the duration and/or start/stop time for one complete cycle of the adder to vary. After each complete adder cycle, a carry signal is sent to a buffer. If a data pulse was received at any time during that one adder cycle (which corresponds to an inspection window), a "1" will be input and stored. Thus, the buffer will temporarily store data bits that match the data contained in the resource memory being transmitted to the input circuit.

BRIEF DESCRIPTION OF THE DRAWINGS

The present invention will be better understood from a reading of the following detailed description of the preferred embodiment in conjunction with the accompanying drawings, in which.

DETAILED DESCRIPTION OF PREFERRED EMBODIMENT

Figure 1:
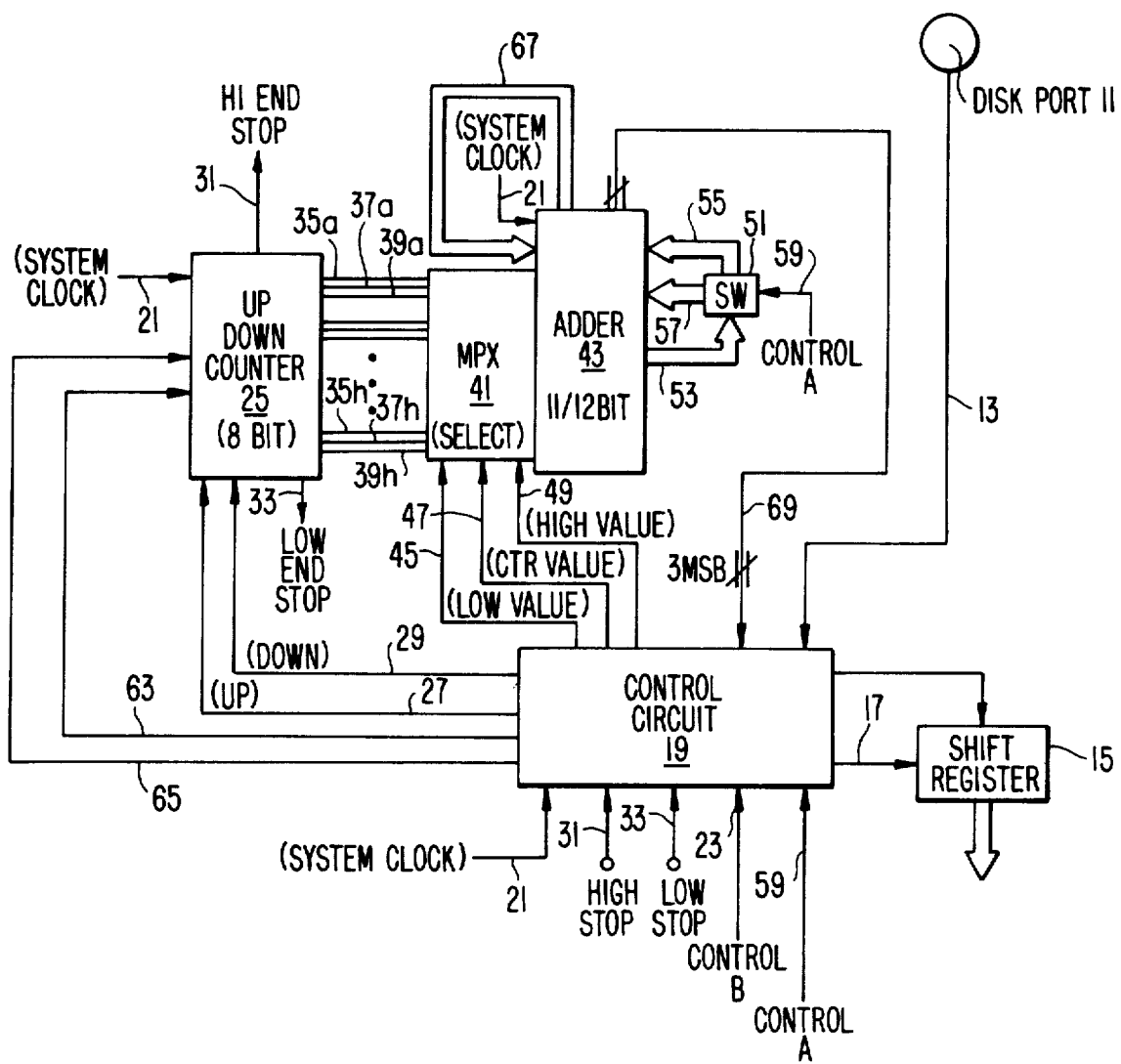
FIG. 1 is a block diagram of the data input circuit of the invention.

A data input circuit is implemented using NMOS LSI digital circuitry and operates to process data pulses received from a resource memory, including data formatted by and received from a floppy disk. The input circuit can process bits of data in typical formats arriving at 4, 6, 8 or 12 microsecond intervals, which enables it to be used with a number of commercially available personal computers. The data input circuit ensures that the data pulses are converted into data bits and stored in the shift register 15, or input data buffer, as a sequence of bits that correctly reflects the data bits stored in the resource memory. Data is received in the form of pulses and is binary (ones or zeros), with the specific absence of a pulse interpreted by the circuitry as a zero. An error occurs if a shift in the time of arrival of a pulse creates an error in the ordering of the data bits as interpreted by the host computer system, so that the data bits input into the input data buffer 15 and processed in the host computer system do not match the data bits stored in the resource memory. The input circuit detects data pulses transmitted from the resource memory and processes them as data bits in an ordered sequence. A "one" is input into register 15 if a pulse is received at any time during a particular receive (adder) cycle; otherwise a "zero" will be stored in the register as the value of the current data bit.

The period of the receive (adder) cycle is chosen to conform with the expected data transfer rate of the memory. Ideally, individual pulses will each be received in the middle of one of a sequence of these receive cycles. Each receive cycle immediately follows the preceding cycle and the time period from beginning to end of the cycle can be referred to as an inspection window. The input circuitry receives a bit stream from the resource memory containing a series of ones and zeros and detects each successive data pulse during one of a series of these inspection windows. Inspection windows have durations and start/stop times that are a function of the basic data bit transfer rate and the deviation in the times of arrival of the most recently detected data pulses from the ideal. Thus, if, for example, there is a basic phase shift of several nanoseconds in the times of arrival of the immediately preceding data pulses from the resource memory, this is compensated for in the data input circuitry by adjusting the start/stop times of the receive cycles. If there is a frequency shift affecting data transfers so that the period between the immediately preceding data pulses is gradually expanding or shortening, this is also compensated for in the data input circuitry by adjusting the duration of the receive cycles. After a receive cycle has ended, a carry signal is generated by the data input circuitry. This carry signal marks the end of an inspection window and causes a "one" to be clocked into the shift register 15, or data input buffer, if a data pulse was received at any time during the window, and causes a "zero" to be stored in the buffer if no pulse was received.

The input circuit in FIG. 1 is connected to a storage medium, such as a floppy disk drive, through a disk port 11. Bits of data are transferred in serial form, one at a time, on a line 13 from the disk port 11, through circuits shown in FIG. 2, and finally to a buffer, the shift register 15. This shift register 15 is clocked by the carry signal on line 17 generated by a control circuit 19, whereby data is input and stored in the register 15, and can then be converted from serial to parallel form and transferred to other processing circuitry in the host computer system.

The data line 13 is also input to the control circuit 19. System clock pulses on lines 21, available in the host computer system or from a dedicated oscillator made a part of the present circuitry, control the timing of the data input circuit and synchronize its operation with the circuitry of the host computer system. In a typical system, data pulses may be one-half to one microsecond wide with a 4, 6, 8 or 12 microsecond period between pulses. A "one" is indicated by a low level—a pulse with a leading edge going low and a trailing edge returning to high. The system clock pulses on lines 21 are generated at a suitable frequency, such as 7.16 MHz. The basic clock rate of 7.16 MHz was chosen to be 28 times faster than the fastest expected rate of arrival of data pulses from the resource memory (i.e., 4 microseconds) and 14 times faster than the receive (adder) cycle rate used to generate the typical inspection window.

An 8 bit up-down counter 25 receives system clock pulses on line 21, an increment up instruction on line 27, an increment down instruction on line 29, an add 4 instruction on line 63, and an add 8 instruction on line 65. The counter 25 has three 8-bit parallel outputs: on lines 35 $a$–$h$, 37 $a$–$h$, and 39 $a$–$h$. A multiplexer 41 operates as a selection switch to pass only the value on either the output lines 35, output lines 37, or output lines 39 as an input to an adder circuit 43 from the counter. The adder 43 is a serial adder, and can be switched to operate as either an 11 or 12-bit adder, so that the input circuit can operate in two different speed modes. Adder 43 is clocked in operation by the system clock. Each sum result at the adder output is input via lines 67 into the adder 43 again so that during each adder cycle the adder continually adds the value of the prior sum result at its output to the value of one of three possible counter outputs selected by the multiplexer 41. The three most significant bits of the sum result output of the adder 43 are input to the control circuit 19 via lines 69.

The variable output at lines 37 of counter 25 is initially set to a nominal value of 146. When the adder is in the 11-bit mode, the adder can output a sum result as high as 11111111111, or 2047 in decimal. A nominal center value of 146 was chosen as the variable output at lines 37 of the up-down counter to the adder as an approximation of 2048 divided by 14. As a result, there are approximately 14 clock pulses for each complete cycle of the adder (i.e., receive cycle), so that the 11-bit adder 43 in ideal operation (no phase or frequency errors) will add the number 146 that is input via lines 37 to its previous total on each clock pulse and will therefore "roll over" back to the same result (because the total number of counts of 2048 is not evenly divisible by 14, however, the count will be four less than the count 14 clock cycles before) after 14 clock pulses. The counter 25 variable output at 37 can be increased using the increment up signal at 27 up to a maximum value of 159, at which point any higher increase is inhibited and a high end stop signal at line 31 is output from the counter 25 to the control circuit 19. Likewise, the counter 25 can be decreased using the increment down signal at 29 but will not decrease below a value of 134, at which point the counter 25 provides a low end stop siqnal at line 33 to the control circuit 19. If for some reason the counter variable output is out of range, the control circuit 19 will respond to the stop signal by sending out either increment up or down signals until the variable output is back within the limits.

A hardwired value of 258 is a fixed high output 35 $a$–$h$ from the counter 25, and a hardwired value of 34 is a fixed low output 39 $a$–$h$ from the counter 25. The counter output 37 $a$–$h$ is the variable output and can range in value from 146 to any number counted up or down therefrom, as constrained by the upper and lower limits of 159 and 134 set on the counter 25. Three control lines 45, 47, and 49 are output from the control circuit 19 to the multiplexer 41 and control the selection of one of the three counter outputs: the fixed low output 35, the variable counter output 37, or the fixed high output 39.

The host computer system provides the system clock pulses on lines 21, a control A signal on lines 59, and a control B signal on lines 23. The state of the control A signal indicates whether the resource memory utilizes single density or double density disks. Adder 43 is placed in one of two modes by a switch 51, which is connected to adder 43 and receives an output from the adder at line 53. The control A signal on line 59 sets the state of switch 51. If the adder is set in the 12-bit state, the output data is reinserted to the adder 43 via line 57 without any jumping or skipping of a bit. If the switch 51 is set for the 11-bit state by the control A signal, this causes the adder via line 55 to bypass one of the stages of the adder and to skip a bit when counting. The adder 43 cycles around twice as fast when it is operating in the 11-bit state so that the inspection windows (and receive cycles) associated with the input circuitry when in this mode have one-half the period of those when the adder is in the 12-bit state. The inspection windows have nominal durations of two microseconds for the 11-bit adder and 4 microseconds for the 12-bit adder.

Figure 2:
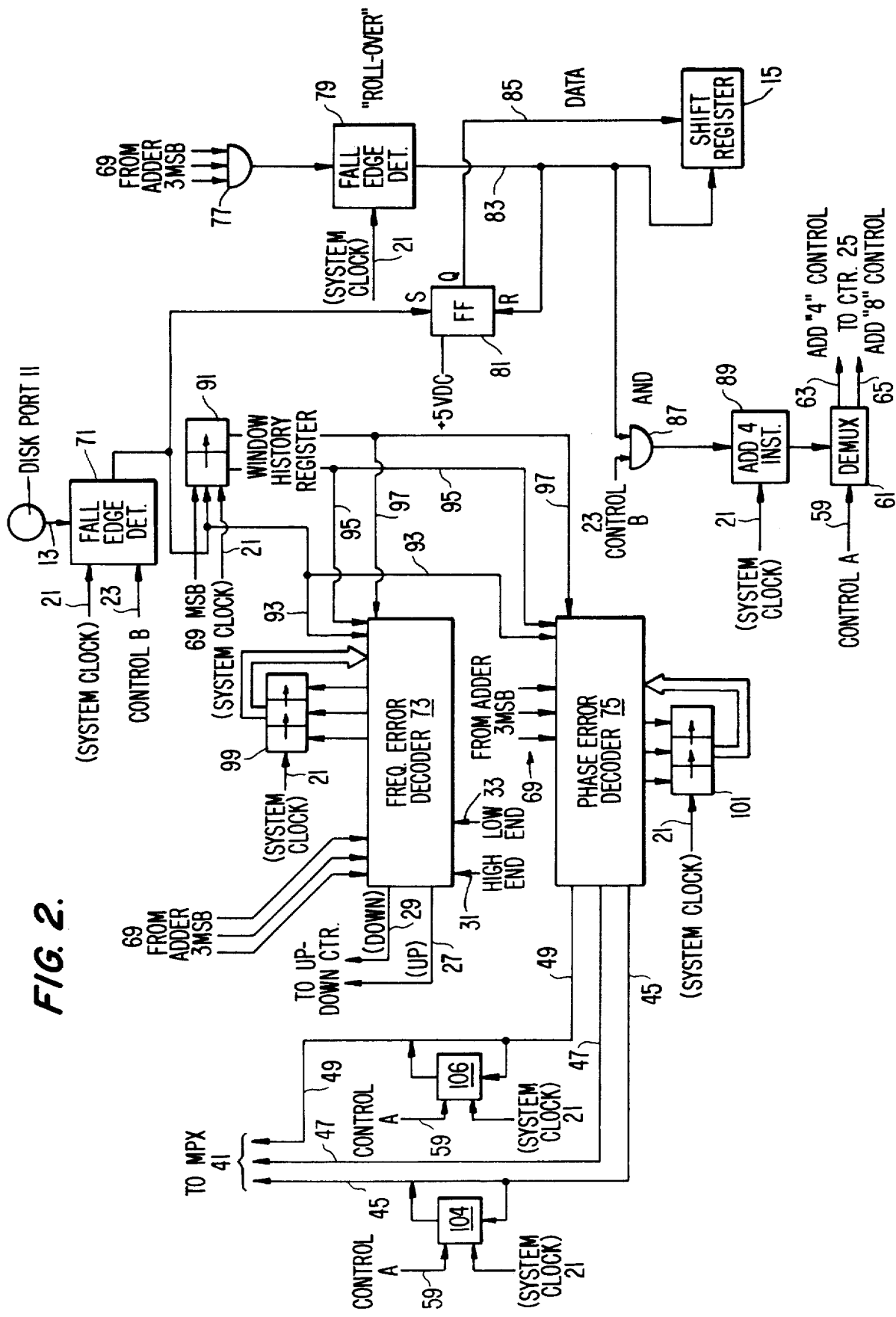
FIG. 2 is a block diagram of the control circuit used in the data input circuit of FIG. 1.

The control circuit 19 is implemented as shown in FIG. 2. Data pulses on line 13 from the disk port 11 are input to a first falling edge detector 71, or input data bit detector, which detector 71 provides a pulse output after detecting the falling leading edge of a data pulse representing a "one" from the resource memory received on line 13. The first detector pulse output is generated in synch with the system clock on line 21, which clocks the output of detector 71. The state of the control B signal indicates whether the host computer system is in a read mode or write mode of operation. The control B signal on line 23 is input into the data bit detector 71 to selectively disable operation of the detector when the host computer system is in the write mode because the host computer system does not read or process data from the resource memory in this state.

The three most significant bits of the adder sum result on lines 69 of the adder 43 are input into a first AND gate 77. The output of this first AND gate 77 is input to a second falling edge detector 79. This second detector 79 is also clocked by the system clock to synchronize its output pulses, which are generated after the falling edge of an output from AND gate 77, with the host system. The second detector 79 and first AND gate 77, or means for detecting the end of a receive cycle, detect when the output of the adder 43 completes an adder cycle and rolls over. This occurs when the calculated sum result that would be output by the adder if it had additional bits exceeds its actual capacity, so that the three most significant bits on lines 69, which were all high, switch to the zero state, whereupon the first AND gate 77 output goes low and second detector 79 outputs a pulse. A D (data) flip flop 81, or input data bit latch, has the output of the first detector 71 connected to its set terminal and the output on line 83 from the second detector 79 connected to its reset terminal. Thus, if an data pulse is detected during a receive cycle, a "one" will be stored in the flip flop. At the end of the receive cycle, the latch will be reset to zero by second detector 79. The Q output on line 85 of the flip flop 81 is input to shift register 15, and is used to serially input bits of data from the memory one at a time per adder (receive) cycle to the shift register 15. The output line 83 of the second detector 79 is input to the shift register 15 as a clocking signal, and is the carry signal on line 17 of FIG. 1 used at the end of an inspection window to cause whatever data bit was stored in the latch 81 during the window to be input as the next bit of data stored in the buffer 15.

The output from the first detector 71 is also input as a clock or enable signal to a shift register 91. The shift register 91 stores a lag/lead history bit for each pulse and shifts the stored data in response to the detection of any additional pulses. The 11 or 12-bit output of the adder 43 indicates the time of arrival of a data pulse in relation to the beginning of the adder (receive) cycle. If it is desired to keep data pulses in, for example, the middle of the inspection window and receive cycle, and the adder cycle is defined as beginning at zero, then the lag or lead status of a received pulse is easily determined by input of only the most significant bit of the adder 43 on lines 69 to register 91. Thus, the register 91 stores the value of the most significant bit of the adder output when each of the two previous data pulses were detected. A "one" indicates the data pulse was detected sometime after the center of the inspection window passed (lag), and a "zero" indicates the data pulse led the center of the inspection window and adder cycle. The shifting of the register 91 causes the retention of the lag/lead history of only the two preceding data pulses detected at the first detector 71.

The output from the data pulse detector 71 is input via line 93 and the two bits of lag/lead history are likewise input via lines 95 and 97 into a frequency error decoder 73 and a phase error decoder 75. The first decoder 73 corrects for frequency drift and the second decoder 75 corrects for phase drift as data pulses are being transmitted from the resource memory.

To determine if an error has occurred, each decoder looks at a history of several pulses, e.g., the current data pulse, and the preceding two data pulses from shift register 91. A 3-bit frequency error parallel/serial shift register 99, or correction amount register, clocked by system clock pulses receives in parallel form three bits from the frequency error decoder 73 that indicate whether additional frequency corrections are required during subsequent clock cycles. Register 99 acts as storage for additional correction commands to be read serially back into the frequency error decoder 73 during successive clock cycles. A 3-bit phase error parallel/serial shift register 101, or correction amount register, clocked by system clock pulses receives in parallel form three bits from the phase error decoder 75 that indicate whether additional phase corrections are required during subsequent clock cycles. Register 101 acts as storage for additional phase correction commands to be read serially back into the phase error decoder. The three most significant bits of the sum result of adder 43 on lines 69 form additional inputs to the frequency error decoder 73 and the phase error decoder 75.

The frequency error decoder 73 can provide an increment up signal at 27 or increment down signal at 29 to the up-down counter 25 to direct the counter to increase or decrease the count of its variable output 37 by one (initial nominal value is 146). The period of the adder (receive) cycle can thereby be increased or decreased because the adder sum result will roll over at a different rate when a number other than 146 is added every clock cycle. The high end stop signal 31 and low end stop signal 33 from the up-down counter 25 are also input into the frequency error decoder 73. The phase error decoder 75 provides either a select low count signal on line 45, a select variable count signal on line 47, or a select high count signal on line 49 to the multiplexer 41, which selects one of counter outputs 35, 37, or 39, respectively, to be input to adder 43 in response. As a result, the sum result in the adder 43 during the next clock cycle is either increased by a count of 34, a count of 258, or a variable count between 134 and 159.

The up-down counter 25, multiplexer 41, and adder 43 define the duration and start/stop time of the inspection window, during which any detected data pulse from resource memory will be read as the next data bit into buffer 15. If detected data pulses do not occur at a regular predetermined time, e.g., the middle, in relation to the start and stop times of the inspection window, there is a phase error. If data pulses are received at a rate deviating from the expected period of either 4, 6, 8 or 12 microseconds, there is a frequency error. During each cycle, the logic in the frequency error decoder and phase error decoder is used to adjust window duration and start/stop time to center the window around the last data pulses received.

The circuitry establishes a nominal variable output of 146 for counter 25 to set a nominal window size for the inspection window, which results in the use of two microsecond wide windows when the control A signal selects an 11-bit adder mode. With this algorithm, data pulses received every 4 microseconds appear in every other window, 6 microsecond data appears in every third window, and 8 microsecond data appears in every fourth window. Window size is adjusted to accommodate for deviations in the frequency of data transfers from memory by increasing or decreasing the variable output of the up-down counter to the adder 43. For example, the data transfer rate may be slower than the nominal rate and therefore, data pulses would be detected after the center of the inspection window. Each adder (receive) cycle, the data pulses would be detected as lagging the center of the window, and as a result, the most significant bit of the sum result for the adder 43 would be a "one" at the instant during the adder cycle that a data pulse is detected. Accordingly, the shift register 91 would be filled with a string of "ones" to indicate the lag/lead history for preceding pulses. The decision to make a frequency correction is made in the frequency error decoder and results when the lag/lead history bit for the preceding pulses, as well as the most significant bit of the sum result for the adder for the current data pulse, indicate that the most recent data pulses are all falling on one side of the window. As a result, an increment down signal on line 29 is sent from the frequency error decoder to the up-down counter 25, which decreases the count of the variable output on lines 37 by one (e.g., from 146 to 145). This decrease in the size of the variable output of the up-down counter will decrease the number being added to the sum result during each clock cycle by the adder 43, and, as a result, the adder 43 will not turn over as quickly and the period of the adder (receive) cycle will increase. Thus, the duration of the inspection window will be increased to account for the slower rate at which data pulses are being detected from the resource memory. A similar process occurs if the data transfer rate from the resource memory begins to increase (so that data pulses are consistently leading the center of the inspection window), requiring an increase in the count of the variable output on lines 37.

Phase corrections are made by the phase error decoder, which will output a select low count signal at 45 or select high count signal at 49 to the multiplexer 41 when a phase error exists. Thus, instead of adding a value between 134 and 159 to the sum result of the adder 43, a value of 258 or 34 will be selected by the multiplexer 41 among the outputs from the counter 25 during several (up to four) of the subsequent clock cycles and added to the sum result by the adder 43. The phase error decoder decides whether to output the select low count signal 45 or the select high count signal 49 based on the value of the most significant bit of the sum result being output by the adder 43 on lines 69. For example, if the last data pulse lagged the center of the adder (receive) cycle, a select low count signal at 45 can cause the sum result of the adder to roll over only after 15 (instead of 14) clock cycles and would therefore delay by a fixed amount the start/stop times of subsequent inspection windows.

The extent of the frequency corrections and phase corrections that are made during each adder cycle, and whether such corrections should be made at all, depends upon the amount of the error as reflected by the amount of time by which the detected data pulse leads or lags the center of the inspection window. The size of this lag or lead is determinable because the sum result of the adder that is output on lines 69 indicates the precise time of arrival of the data pulse with respect to the beginning of the adder cycle. The three most significant bits from the adder sum result are input to both the frequency error decoder and the phase error decoder in order to enable the logic circuits therein to vary the amount of correction made during any given adder cycle to the duration and start/stop times of the inspection windows. For example, a binary value of 100 for the three most significant bits would indicate only a small lag in the arrival of the latest data pulse, whereas a value of 000 would indicate an extremely large lead. In the embodiment shown in the drawings, the size of a frequency or phase correction during any one system clock cycle is fixed and discrete. However, the relative magnitude of the phase and frequency corrections made during a complete receive cycle can be varied by the decoders 73 and 75 by making up to four corrections by causing the same correction to occur during up to four distinct system clock cycles. The parallel/serial shift registers 99 and 101 indicate whether additional corrections for phase and frequency errors will be made. Either 000, 001, 011, or 111 is loaded by the decoders 73 and 75 into their respective correction amount registers 99 and 101, depending on the magnitude of the three most significant bits of the sum result from the adder 43. Thus, the bits loaded into the 3-bit shift register 101 by the phase error decoder would be 000 if the three most significant bits had binary values of 011 or 100, bits 001 would be stored in register 101 if the most significant bits from the adder were 010 or 101, bits 011 would be sent to register 101 if the most significant bits read 001 or 110, and bits 111 would be output to register 101 if the most significant bits read 000 or 111 (which indicates the maximum possible amount of lead and lag by an input data pulse). The registers 99 and 101 are loaded with the additional correction amount bits during the same clock cycle that the first frequency and/or phase correction is being made. On subsequent clock cycles, the bits stored in the correction amount registers 99 and 101 are serially shifted one bit at a time into the frequency error decoder and the phase error decoder. The additional correction requests input as a bit to the decoders 73 and 75 cause each to make corrections exactly as described before during additional clock cycles if the bit serially shifted in from the respective correction register indicates an additional correction is needed. Thus, in the preferred embodiment shown in the figures, the correction amount registers are necessary because a correction made during any one clock cycle has only a single fixed magnitude.

The counter 25 and adder 43, in cooperation with the frequency error decoder 73 and the phase error decoder 75 (which determine the amount of feedback received by the adder), form a digital phase locked loop responsive to data pulses received from the resource memory. The phase locked loop tracks a train of data pulses from the memory which may vary in phase and in frequency. The speed at which the sum result of the adder 43 rolls over, which corresponds with the duration and start/stop times of the receive (adder) cycle (or inspection window), is continually being adjusted with feedback that matches the phase and frequency of the receive (adder) cycles with the phase and frequency of the data pulses received at the data bit detector 71. The phase error decoder adjusts the phase of the adder cycle (changes the start/stop times of the inspection window) in order to maintain the data pulses in the center of the inspection windows. The frequency error decoder adjusts the frequency of the adder cycle (changes the size of the inspection window), and thereby adjusts the period of receive cycles so that they match or are evenly divisible into the period between successive data pulses. The nominal value of 146 by which the sum result of the adder is normally incremented was selected in order to have the time it takes to complete one adder (receive) cycle be divisible into a typical transfer rate of bits from a floppy disk. A well-designed phase locked loop, used to track a varying input signal, should be fast settling but stable. A large amount of phase correction causes the loop to settle faster, but also makes it more sensitive to noise. On the other hand, if too much frequency correction is used, the loop can become unstable. The proper ratio of phase and frequency correction provided in the loop is important. The amount of phase correction must hold the next data input pulse in the correct inspection window while enough frequency correction is provided to ensure that the inspection windows are of the correct duration. If not enough phase correction is provided, it is possible for a data input pulse to be detected during the wrong inspection window, and this in turn would prevent a proper determination of the amount of needed frequency correction. The nominal variable counter output of 146, as well as the fixed low value of 34 and the fixed high value of 258, are selected in order to maintain the proper ratio of phase and frequency correction feedback. Thus, if only a small phase correction is needed for a lag in the train of input data pulses, the addition of only 34 (instead of 146) to the sum result of the adder during one clock cycle will probably cause the adder to take one extra clock cycle to roll over. A single frequency correction, incrementing the variable counter output from 146 to 147, will slow the adder cycle rate by 0.7%. It has been determined that smaller percentage changes in the period of the phase locked loop do not provide much of an improvement in performance, whereas problems in reading data from floppy disks may become noticeable if the duration of the inspection windows cannot be adjusted by a fine enough amount.

When the input circuit is in the 12-bit adder mode, the cycle period for the adder and the phase locked loop is nominally four microseconds, or 28 clock cycles. The inspection window is twice as long, so that a single frequency correction from, e.g., 146 to 147, changes the sum result of the adder by a total of 28 counts rather than 14 counts during each complete adder cycle. However, a single phase correction from, e.g., 146 to 34, continues to change the adder sum result by a total of 112 during one adder cycle regardless of the adder mode. Therefore, by changing the nominal cycle time of the phase locked loop from 2 microseconds to 4 microseconds in switching to a 12-bit adder, the amount of frequency correction feedback is effectively doubled when compared with the amount of phase correction feedback. As described above, a proper ratio of phase and frequency correction feedback is desirable, and too much frequency correction can cause oscillation of the phase locked loop. Therefore, to maintain the same ratio of phase and frequency correction feedback when switching from the 11-bit to 12-bit adder mode, double the normal phase correction of 112 counts per adder cycle is needed. This is accomplished with the pulse-doubling one shots 104 and 106. Doubler structures are connected to select lines 45 and 47, which are output from the phase error decoder 75 to the multiplexer 41. They cause the high or low count select signals, if output by the phase error decoder, to be repeated after four clock cycles so that the fixed low value of 34 or high value of 258 is output twice as often from counter 25 into adder 43, and thereby provide for multiplying the amount of phase correction by a factor of two when the adder 43 is operating in the slower 12-bit mode. Subsequent corrections requested by the correction amount register 101 are executed without interference by delaying the phase correction commands from the doubler structures by four clock cycles. A first one shot 104 operates as a pulse repeater connected to line 45. This one shot circuit 104 will receive a pulse on line 45 output by decoder 75, and then repeat it by placing a second pulse on the line 45 to multiplexer 41 after the required delay if the control A signal on line 59 for selecting 12 bits is input into the one shot circuit 104. A second one shot circuit 106 is similarly responsive to the control A signal on line 59, and is connected to control line 49 to act as a pulse repeater with respect to line 49. As a result, the magnitude of any phase correction is doubled from a minimum total of 112 counts in the 11-bit mode (146 versus 34 or 258) to a total of 224 counts in the 12-bit mode.

When the host system is in the write mode of operation, the state of the control B signal on line 23 changes so that data bits cannot be input from the disk port 11 into the data input buffer 15. Instead, data bits are written from an output data buffer (not shown) to the resource memory, and the same carry signal on line 83 can be used to clock data bits both into the data buffer 15 and out of the output data buffer during data transfers with the resource memory. When writing data onto a memory device, it is important to keep the period between each transmitted data bit as stable as possible. In the 11-bit adder mode, a data bit is output every 14 clock cycles in the write mode in response to the carry signal. In order to maintain this uniform period between carry signals in the write mode, an error correction is built into the circuitry to operate only in the write state, gated on the state of the control B signal on line 23. A potential deviation in adder cycle duration exists because the nominal inspection window width of two microseconds is not evenly divisible into 14 even time increments when using an adder that makes a total of 2048 counts. If a correction were not made, the adder 43 would sometimes complete its count (and cause a carry signal to clock data out of the output data buffer) in 13 clock pulses instead of always in 14 pulses. Division by 14 of the 11-bit adder maximum count of 2048 leaves a remainder of 4. Therefore, every 14 (11-bit mode) or 28 (12-bit mode) clock pulses, the adder sum result must be increased by a fixed amount so that the identical sum result appears every 14 or 28 clock pulses. When the control A signal on line 59 for 11 bits is applied to the circuit, an add 4 command is sent as an instruction to the counter 25. When the control A signal is set for 12 bits, an add 8 command is sent to the counter. The add 4 and add 8 commands are generated only once per adder cycle in response to AND gate 87 being enabled by detector 79 when the adder 43 rolls over and begins a new adder cycle. Either the add 4 or add 8 command is selected by demultiplexer 61 in response to the state of the control A signal, and the proper command is sent out as a pulse on line 63 (add 4) or line 65 (add 8). The add 4 and add 8 commands are synchronized with the system by instruction generator 89, which receives inputs from AND gate 87 and the system clock and outputs a signal to the demultiplexer 61.

The combinatorial functions performed by the decoders 73 and 75 are implemented using a programmable logic array (PLA). The techniques for programming the PLA to implement a truth table are well known to those skilled in the art. In the ideal embodiment, the phase decoder 75 does not utilize the inputs from the history register 91. The relation between the decoder inputs and outputs is as follows:

TABLE I

| INPUT (from MSB of adder) | PHASE CORRECTION OUTPUT (112/2048 of cycle = +1) |
|---|---|
| 0 | +4 |
| 1 | +3 |
| 2 | +2 |
| 3 | +1 |
| 4 | −1 |
| 5 | −2 |
| 6 | −3 |
| 7 | −4 |

TABLE II

| MSB INPUT | ERROR HISTORY INPUT (none in same direction = 0) | | |
|---|---|---|---|
| | 0 | 1 | 2 |
| | FREQUENCY CORRECTION OUTPUT (1/146 = +1) | | |
| 0 | 0 | +3 | +4 |
| 1 | 0 | +2 | +3 |
| 2 | 0 | +1 | +2 |
| 3 | 0 | 0 | +1 |
| 4 | 0 | 0 | −1 |
| 5 | 0 | −1 | −2 |
| 6 | 0 | −2 | −3 |
| 7 | 0 | −3 | −4 |

The disclosures in copending application entitled "Video Game and Personal Computer," filed July 19, 1985, Ser. No. 756,910, entitled "Peripheral Control Circuitry for Personal Computer," filed July 18, 1986, Ser. No. 886,614, and entitled Display Generator Circuitry for Personal Computer System, filed July 18, 1986, Ser. No. 886,796, are herein incorporated by reference.

The above description of the invention is intended to be illustrative of a single preferred embodiment. Changes can be made to the structures described herein without departing from the features and scope of the invention.

What is claimed is:

1. A process for reading a plurality of input data bits transmitted serially from a resouce memory, comprising the following steps:

detecting an input data bit, each of the plurality of data bits being detected during a corresponding one of a plurality of receive cycles;
   generating a number that is changed by a non-zero nominal amount in response to the presence off a clock signal to identify each of a plurality of time periods of the receive cycle, including early and late time periods;
   generating a carry signal in response to the generated number reaching a predetermined amount during one of the time periods during each receive cycle;
   storing the generated number when a data bit is detected to identify the time period during which the data bit is detected;
   generating a first phase control signal to advance the start/stop time of each receive cycle at times when the stored number indicates the data bit was detected during an early time period of the corresponding receive cycle;
   generating a second phase control signal to delay the start/stop time of each receive at cycle times when the stored number indicates the data bit was detected during a late time period of the corresponding receive cycle;
   changing the generated number by an amount larger than the nominal amount and unequal to twice the nominal amount in response to the presence of the clock signal at times when the first phase control signal is present, to advance the start/stop time of each receive cycle;
   changing the generated number by a non-zero amount smaller than the nominal amount in response to the presence of the clock signal at times when the second phase control signal is present, to delay the start/stop time of each receive cycle; and
   storing the detected data bit in a data buffer in response to the presence of the carry signal.

2. Apparatus for reading a plurality of input data bits transmitted serially from a resouce memory, comprising:

means for detecting an input data bit, each of the plurality of data bits being detected during a corresponding one of a plurality of receive cycles;
   means for generating a number that is changed by a non-zero nominal amount in response to the presence of a clock signal to identify each of a plurality of time periods of the receive cycle, including early and late time periods;
   means coupled to the number generating means for generating a carry signal in response to the generated number reaching a predetermined amount during one of the time periods during each receive cycle;
   means coupled to the detecting means and the number generating means for storing the generated number when a data bit is detected to identify the time period during which the data bit is detected;
   means coupled to the number storing means for generating a first phase control signal to advance the start/stop time of each receive cycle at times when the stored number indicates the data bit was detected during an early time period of the corresponding receive cycle;
   means coupled to the number storing means for generating a second phase control signal to delay the start/stop time of each receive cycle at times when the stored number indicates the data bit was detected during a late time period of the corresponding receive cycle;

means coupled to the number generating means and the first phase control signal generating means for changing the generated number by an amount larger than the nominal amount and unequal to twice the nominal amount in response to the presence of the clock signal at times when the first phase control signal is present, to advance the start/stop time of each receive cycle;

means coupled to the number generating means and the second phase control signal generating means for changing the generated number by a non-zero amount smaller than the nominal amount in response to the presence of the clock signal at times when the second phase control signal is present, to delay the start/stop time of each receive cycle; and data buffer means coupled to the detecting means and the carry signal generating means for storing the detected data bit in response to the presence of the carry signal.

3. Apparatus in accordance with claim 2, in which the number generating means includes adder means for providing the generated number as a sum, and for adding an addend equal to the nominal amount to the generated number in response to the presence of the clock signal at times when the first and second phase control signals are not generated.

4. Apparatus in accordance with claim 2, in which the apparatus comprises a disk port.

5. Apparatus in accordance with claim 2, in which the data buffer means is coupled to computer system for providing the input data bits to the computer system.

6. Apparatus in accordance with claim 5, in which the data buffer means includes shift register means for serially storing each data bit in response to the presence of the carry signal, and for providing a plurality of data bits to the computer system in parallel.

7. Apparatus in accordance with claim 2, in which the number storing means includes shift register means for storing a bit of the generated number corresponding to the time period during which a data bit was detected in response to the presence of the clock signal.

8. Apparatus in accordance with claim 2, in which the first and second phase control signal generating means respectively advance and delay the start/stop time of each receive cycle even further by generating a plurality of first and second phase control signals.

9. A process for reading a plurality of input data bits transmitted serially from a resource memory, comprising the following steps:

detecting an input data bit, each of the plurality of data bits being detected during a corresponding one of a plurality of receive cycles;

generating a number that is changed by a nominal amount in response to the presence of a clock signal to identify each of a plurality of time periods of the receive cycle, including early and late time periods;

generating a carry signal in response to the generated number reaching a predetermined amount during one of the time periods during each receive cycle;

storing a plurality of generated numbers, each generated number being stored when each of a plurality of data bits is detected, to identify the time period during which each data bit is detected;

generating a first frequency control signal to shorten the duration of each receive cycle at times when the plurality of stored numbers indicates a plurality of data bits was detected during early time periods of the corresponding receive cycles;

generating a second frequency control signal to lengthen the duration of each receive cycle at times when the plurality of stored numbers indicates a plurality of data bits was detected during late time periods of the corresponding receive cycles;

changing the nominal amount to a larger amount in response to the presence of the first frequency control signal, to shorten the duration of each receive cycle;

changing the nominal amount to a smaller amount in response to the presence of the second frequency control signal, to lengthen the duration of each receive cycle; and storing the detected data bit in a data buffer in response to the presence of the carry signal.

10. Apparatus for reading a plurality of input data bits transmitted serially from a resource memory, comprising:

means for detecting an input data bit, each of the plurality of data bits being detected during a corresponding one of a plurality of receive cycles;

means for generating a number that is changed by a nominal amount in response to the presence of a clock signal to identify each of a plurality of time periods of the receive cycle, including early and late time periods;

means coupled to the number generating means for generating a carry signal in response to the generated number reaching a predetermined amount during one of the time periods during each receive cycle;

means coupled to the detecting means and the number generating means for storing a plurality of generated numbers, each generated number being stored when each of a plurality of data bits is detected, to identify the time period during which each data bit is detected;

means coupled to the number storing means for generating a first frequency control signal to shorten the duration of each receive cycle at time when the plurality of stored numbers indicates a plurality of data bits was detected during early time periods of the corresponding receive cycles;

means coupled to the number storing means for generating a second frequency control signal to lengthen the duration of each receive cycle at times when the plurality of stored numbers indicates a plurality of data bits was detected during late time periods of the corresponding receive cycles;

means coupled to the number generating means and the first frequency control singal generating means for changing the nominal amount to a larger amount in response to the presence of the first frequency control signal, to shorten the duration of each receive cycle;

means coupled to the number generating means and the second frequency control signal generating means for changing the nominal amount to a smaller amount in response to the presence of the second frequency control signal, to lengthen the duration of each receive cycle; and data buffer means coupled to the detecting means and the carry signal generating means for storing the detected data bit in response to the presence of the carry signal.

11. Apparatus in accordance with claim 10, in which the number generating means includes adder means for providing the generated number as a sum, and for adding an addend equal to the nominal amount to the generated number in response to the presence of the clock signal.

12. Apparatus in accordance with claim 10, in which the number generating means includes counter means for providing the nominal amount, for incrementing the nominal amount at times when the first frequency control signal is generated, and for decrementing the nominal amount at times when the second frequency control signal is generated.

13. Apparatus in accordance with claim 10, in which the apparatus comprises a disk port.

14. Apparatus in accordance with claim 10, in which the data buffer means is coupled to a computer system for providing the input data bits to the computer system.

15. Apparatus in accordance with claim 14, in which the data buffer means includes shift register means for serially storing each data bit in response to the presence of the carry signal, and for providing a plurality of data bits to the computer system in parallel.

16. Apparatus in accordance with claim 10, in which the number storing means includes shift register means for sequentially storing a bit for each of a plurality of generated numbers corresponding to the time period during which each data bit was detected in response to the presence of the clock signal.

17. Apparatus in accordance with claim 10, in which the first and second frequency control signal generating means respectively shorten and lengthen the duration of each receive cycle even further by generating a plurality of first and second frequency control signals.

18. A process for reading a plurality of input data bits transmitted serially from a resouce memory, comprising the following steps:
   detecting an input data bit, each of the plurality of data bits being detected during a corresponding one of a plurality of receive cycles;
   generating a number that is changed by a nominal amount in response to the presence of a clock signal to identify each of a plurality of time periods of the receive cycle, including early and late time periods;
   generating a carry signal in response to the generated number reaching a predetermined amount during one of the time periods during each receive cycle;
   storing a plurality of generated numbers, each generated number being stored when each of a plurality of data bits is detected, to identify the time period during which each data bit is detected;
   generating a first phase control singal to advance the start/stop time of each receive cycle at times when a stored number indicates a data bit was detected during an early time period of the corresponding receive cycle;
   generating a second phase control signal to delay the start/stop time of each receive cycle at times when a stored number indicates of a data bit was detected during a late time period of the corresponding receive cycle;
   changing the generated number by an amount larger than the nominal amount in response to the presence of the clock signal at times when the first phase control signal is present, to advance the start/stop time of each receive cycle;
   changing the generated number by an amount smaller than the nominal amount in response to the presence of the clock signal at times when the second phase control signal is present, to delay the start/stop time of each receive cycle;
   generating a first frequency control signal to shorten the duration of each receive cycle at times when the plurality of stored numbers indicates a plurality of data bits was detected during early time periods of the corresponding receive cycles;
   generating a second frequency control signal to lengthen the duration of each receive cycle at time when the plurality of stored numbers indicates a plurality of data bits was detected during late time periods of the corresponding receive cycles;
   changing the nominal amount to a larger amount in response to the presence of the first frequency control signal, to shorten the duration of each receive cycle;
   changing the nominal amount to a smaller amount in response to the presence of the second frequency control signal, to lengthen the duration of each receive cyclee; and
   storing the detected data bit in a data buffer in response to the presence of the carry signal.

19. Apparatus for reading a plurality of input data bits transmitted serially from a resource memory, comprising:
   means for detecting an input data bit, each of the plurality of data bits being detected during a corresponding one of a plurality of receive cycles;
   means for generating a number that is changed by a nominal amount in response to the presence of a clock signal to identify each of a plurality of time periods of the receive cycle, including early and late time periods;
   means coupled to the number generating means for generating a carry signal in response to the generated number reaching a predetermined amount during one of the time periods during each receive cycle;
   means coupled to the detecting means and the number generating means for storing a plurality of generated numbers, each generated number being stored when each of a plurality of data bits is detected, to identify the time period during which each data bit is detected;
   means coupled to the number storing means for generating a first phase control signal to advance the start/stop time of each receive cycle at times when a stored number indicates a data bit was detected during an early time period of the corresponding receive cycle;
   means coupled to the number storing means for generating a second phase control signal to delay the start/stop time of each receive cycle at times when a stored number indicates a data bit was detected during a late time period of the corresponding receive cycle;
   means coupled to the number generating means and the first phase control signal generating means for changing the generated number by an amount larger than the nominal amount in response to the presence of the clock signal at times when the first phase control signal is present, to advance the start/stop time of each receive cycle;
   means coupled to the number generating means and the second phase control signal generating means for changing the generated number by an amount smaller than the nominal amount in response to the presence of the clock signal at times when the second phase control signal is present, to delay the start/stop time of each receive cycle;

means coupled to the number storing means for generating a first frequency control signal to shorten the duration of each receive cycle at times when the plurality of stored numbers indicates a plurality of data bits was detected during early time periods of the corresponding receive cycles;

means coupled to the number storing means for generating a second frequency control signal to lengthen the duration of each receive cycle at times when the plurality of stored numbers indicates a plurality of data bits was detected during late time periods of the corresponding receive cycles;

means coupled to the number generating means and the first frequency control signal generating means for changing the nominal amount to a larger amount in response to the presence of the first frequency control signal, to shorten the duration of each receive cycle;

means coupled to the number generating means and the second frequency control signal generating means for changing the nominal amount to a smaller amount in response to the presence of the second frequency control signal, to lengthen the duration of each receive cycle; and data buffer means coupled to the detecting means and the carry signal generating means for storing the detected data bit in response to the presence of the carry signal.

20. Apparatus in accordance with claim 19, in which the number generating means includes adder means for providing the generated number as a sum, and for adding an addend equal to the nominal amount to the generated number in response to the presence of the clock signal at times when the first and second phase contol signals are not generated.

21. Apparatus in accordance with claim 19, in which the number generating means includes counter means for providing the nominal amount, for incrementing the nominal amount at times when the first frequency control signal is generated, and for decrementing the nominal amount at times when the second frequency control signal is generated.

22. Apparatus in accordance with claim 19, in which the apparatus comprises a disk port.

23. Apparatus in accordance with claim 19, in which the data buffer means is coupled to a computer system for providing the input data bits to the computer system.

24. Apparatus in accordance with claim 23, in which the data buffer means includes shift register means for serially storing each data bit in response to the presence of the carry signal, and for providing a plurality of data bits to the computer system in parallel.

25. Apparatus in accordance with claim 19, in which the number storing means includes shift register means for sequentially storing a bit for each of a plurality of generated numbers corresponding to the time period during which each data bit was detected in response to the presence of the clock signal.

26. Apparatus in accordance with claim 19, in which the first and second phase control signal generating means respectively advance and delay the start/stop time of each receive cycle even further by generating a plurality of first and second phase control signals, and in which the first and second frequency control signal generating means respectively shorten and lengthen the duration of each receive cycle even further by generating a plurality of first and second frequency control signals.

* * * * *